United States Patent
Meng et al.

(10) Patent No.: US 12,307,718 B2
(45) Date of Patent: May 20, 2025

(54) CASCADING EXPANSION METHOD OF WORKING SPACE AND WORKING VISUAL ANGLE OF STEREO VISION SYSTEM

(71) Applicant: BEIHANG UNIVERSITY, Beijing (CN)

(72) Inventors: Cai Meng, Beijing (CN); Xinliang Deng, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 369 days.

(21) Appl. No.: 17/897,244

(22) Filed: Aug. 29, 2022

(65) Prior Publication Data

US 2022/0405971 A1 Dec. 22, 2022

Related U.S. Application Data

(63) Continuation of application No. PCT/CN2021/072834, filed on Jan. 20, 2021.

(30) Foreign Application Priority Data

Jun. 2, 2020 (CN) .......................... 202010487757.3

(51) Int. Cl.
*G06T 7/80* (2017.01)
*B25J 9/16* (2006.01)

(52) U.S. Cl.
CPC ............... *G06T 7/85* (2017.01); *B25J 9/1697* (2013.01); *G06T 2207/10012* (2013.01)

(58) Field of Classification Search
CPC .... G06T 7/85; G06T 7/80; G06T 7/70; G06T 7/90; G06T 7/73; G06T 7/593; G06T 2207/00; G06T 2207/10; G06T 2207/10012; G06T 2207/30204; G06T 2207/10021; G06T 2207/30241;
(Continued)

(56) References Cited

U.S. PATENT DOCUMENTS 10,009,640 B1 * 6/2018 Lodato ................. G01B 11/245
11,751,944 B2 * 9/2023 Lang .................... A61B 17/1703
606/130
(Continued)

FOREIGN PATENT DOCUMENTS

CA 3102860 C * 8/2023 ......... G06K 9/00208
CN 108230379 A * 6/2018 ........... G01C 21/165
(Continued)

*Primary Examiner* — Jeffrey P Aiello

(57) ABSTRACT

A cascading expansion method of working space and working visual angle of stereo vision system is disclosed. One stereo vision system in the multi stereo vision systems is fixed as the global vision system, and the other stereo vision systems can move the position and adjust the visual angle according to the needs during the working process, so as to effectively expand the working space and working visual angle of the stereo vision system and improve the flexibility of the stereo vision system. For the target to be measured that cannot be seen under the global stereo vision, the indirect positioning of the target to be measured under the global coordinate system can be achieved through other stereo vision systems, so as to overcome the limitation of the limited visual angle of a single stereo vision system and the limited workspace.

2 Claims, 1 Drawing Sheet

(58) Field of Classification Search
CPC ........... G06T 2207/30244; B25J 9/1689; B25J 9/1697; B25J 13/089; G01B 11/002; G01B 11/2504; G01B 21/042; G01B 5/008; H04N 2013/0081; A61B 1/00193; A61B 1/018; A61B 1/04; A61B 34/37
USPC .......... 73/1.79; 318/561, 565; 356/614, 623; 382/103, 107, 154; 606/130; 700/245, 700/160; 702/94, 150, 152, 85, 95, 188, 702/153
See application file for complete search history.

(56) References Cited

U.S. PATENT DOCUMENTS

| | | | |
|---|---|---|---|
| 2010/0017178 A1* | 1/2010 | Tsuk .......................... | G06T 7/73 |
| | | | 701/300 |
| 2021/0192759 A1* | 6/2021 | Lang ...................... | A61B 90/98 |

FOREIGN PATENT DOCUMENTS

| | | | | | |
|---|---|---|---|---|---|
| CN | 108648241 A | * | 10/2018 | ............. | G06T 5/006 |
| CN | 110232710 A | * | 9/2019 | ............. | G06T 7/344 |
| CN | 110006402 B | * | 3/2021 | ............. | G01C 11/00 |
| EP | 3511122 A1 | * | 7/2019 | ............. | B23Q 17/24 |

* cited by examiner

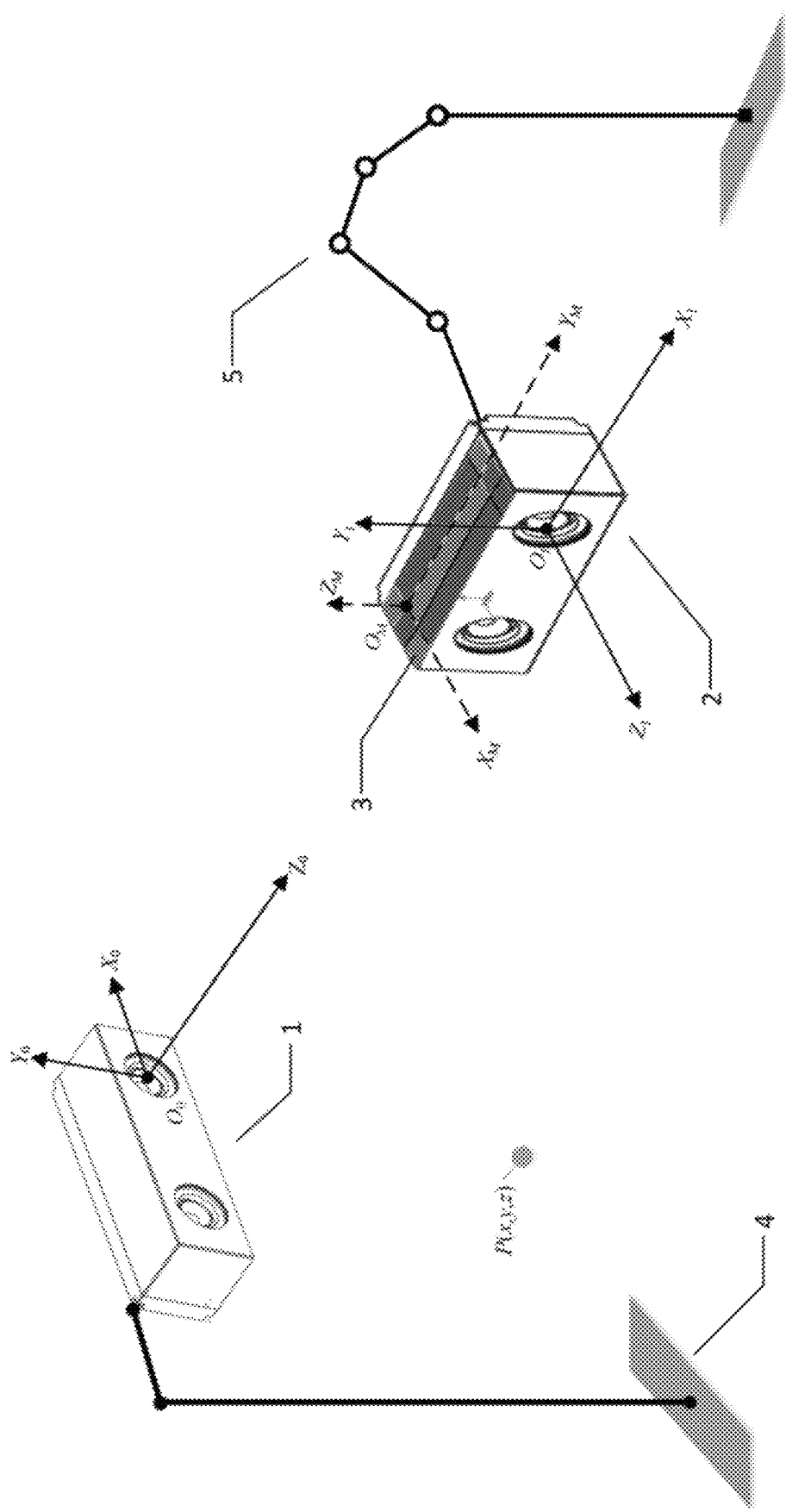

CASCADING EXPANSION METHOD OF WORKING SPACE AND WORKING VISUAL ANGLE OF STEREO VISION SYSTEM

CROSS REFERENCE TO RELATED APPLICATION

This patent application is a continuation application of PCT/CN2021/072834, filed on Jan. 20, 2021, which claims the benefit and priority of Chinese Patent Application No. 202010487757.3, filed on Jun. 2, 2020, the disclosure of which is incorporated by reference herein in its entirety as part of the present application.

TECHNICAL FIELD

The present disclosure relates to the technical field of stereo vision measurement, and more specifically, to a method for expanding the working space and working visual angle of a stereo vision system by cascading multiple stereo vision systems

BACKGROUND ART

A stereo vision position and posture measurement system has the ability to measure the position and posture of the target without contact. In medical robot assisted surgery, it is often used to measure and track the position and posture of surgical instruments and targets. However, stereo vision has the disadvantages of limited working space, fixed working visual angle, contradiction between working distance and measurement accuracy, and the surgical instruments to be tracked are easy to be blocked.

In the actual working scene, a large operation space needs to be reserved. In order to avoid interference with surgical operations, either the stereo vision system needs to be moved, or the stereo vision system needs to have a larger working space and working distance. However, for a single stereo vision system, the cost of increasing the workspace and working distance is to sacrifice the positioning accuracy.

In order to increase the working space, expand the working distance and improve the measurement accuracy, there are mainly the following two ways. (1) To increase the binocular baseline distance and improve the camera resolution, or to shorten the focal length of lens and expand the visual field of camera. Shortening the focal length of lens helps to increase the visual field, but it will reduce the positioning accuracy. Increasing the binocular baseline distance helps to increase the working distance and improve the working accuracy, but it will reduce the workspace. Improving the resolution of the camera helps to improve the accuracy, but it will increase the system cost and reduce the speed of image processing. Moreover, no matter what measures are taken above, the visual angle must be kept fixed during the work process, and there will be a problem that the sight line will be affected by occlusion. (2) To utilize multiple stereo vision systems. Multiple stereo vision systems are arranged in the working scene, and all stereo vision systems are registered to the same world reference coordinate system through the global calibration method. Due to the existence of multiple stereo vision systems, each system can have its own workspace and working visual angle, so it can expand the workspace and make up for the limited visual angle of a single stereo vision system. In the above method, the layout of stereo vision systems will be limited by the global calibration method, and all stereo vision systems must be fixed in the working process, otherwise the relative position and posture relationship will change, and the system will fail.

SUMMARY

In view of the above, the present disclosure provides a cascading expansion method of working space and working visual angle of stereo vision system to effectively expand the working space and working visual angle of the stereo vision system.

The cascading expansion method of working space and working visual angle of stereo vision system provided by the present disclosure includes the following steps.

S1: N stereo vision systems are selected, with the No. 1 stereo vision system as a master stereo vision system and the No. 2 to No. N stereo vision systems as slave stereo vision systems. A visual coordinate system of the master stereo vision system is taken as a global reference coordinate system $\{W\}$. N is an integer greater than 1.

S2: A manual marker $Marker_n$ is pasted or printed on an outer surface of the No. n stereo vision system, and a local coordinate system $\{M_n\}$ is established by the manual marker $Marker_n$, wherein, n=2, 3, ..., N. And different stereo vision systems correspond to different manual markers.

S3: An inherent position and posture relationship between the local coordinate system $\{M_n\}$ established by the manual marker $Marker_n$ and a visual coordinate system $\{C_n\}$ of the No. n stereo vision system is described by a spatial mapping matrix $T_{\{C_n\} \to \{M_n\}}$ determined by calibration method.

S4: The No. 1 stereo vision system is fixedly connected with a global vision system bracket. After a working position and visual angle direction of the No. 1 stereo vision system are determined, the No. 1 stereo vision system is fixed and kept unchanged throughout the working process.

S5: The No. n stereo vision system is fixedly connected with a No. n self-locking traction manipulator, and the working position and visual angle direction of the No. n stereo vision system are adjusted at any time through force traction, so that the manual marker $Marker_n$ is visible in an effective working space of the No. 1 stereo vision system, and a target P to be measured is visible in an effective working space of the No. n stereo vision system.

S6: A spatial position and posture of the local coordinate system $\{M_n\}$ established by the manual marker $Marker_n$ on the No. n stereo vision system is measured by the No. 1 stereo vision system, and is recorded as $T_{\{M_n\} \to \{W\}}$. A position and posture of the target P to be measured in the effective workspace of the No. n stereo vision system is measured by the No. n stereo vision system, and is recorded as $\hat{P}^{\{C_n\}}$. In combination with the spatial mapping matrix $T_{\{C_n\} \to \{M_n\}}$ of the local coordinate system $\{M_n\}$ established by the calibrated manual marker $Marker_n$ and the visual coordinate system $\{C_n\}$ of the No. n stereo vision system, a transformation of the position and posture of the target P to be measured from the visual coordinate system $\{C_n\}$ of the No. n stereo vision system to the visual coordinate system of the No. 1 stereo vision system, that is, the global reference coordinate system $\{W\}$, is realized:

$$\hat{P}^{\{W\}} = T_{\{M_n\} \to \{W\}} \cdot T_{\{C_n\} \to \{M_n\}} \hat{P}^{\{C_n\}}$$

wherein, $\hat{P}^{\{W\}}$ is coordinates of the target P to be measured in the global reference coordinate system $\{W\}$, $\hat{P}^{\{C_n\}}$ is coordinates of the target P to be measured in the visual coordinate system $\{C_n\}$ of the No. n stereo vision system, $\hat{P}=[x\ y\ z\ 1]^T$ is homogeneous coordinates of $P=[x\ y\ z]^T$, and (x, y, z) is coordinates of the target P to be measured in the three-dimensional space coordinate system.

In one possible implementation, in the cascading expansion method of working space and working visual angle of stereo vision system of the present disclosure, in step S2, the manual marker Marker$_n$ is a planar marker with at least three non-collinear feature points.

In the cascading expansion method of working space and working visual angle of stereo vision system provided by the disclosure, one stereo vision system in the multi stereo vision systems is fixed as the global vision system, and the other stereo vision systems can move the position and adjust the visual angle according to the needs during the working process, so as to effectively expand the working space and working visual angle of the whole stereo vision system and improve the flexibility of the whole stereo vision system. For the target to be measured that cannot be seen under the global stereo vision, the indirect positioning of the target to be measured under the global coordinate system can be achieved through other stereo vision systems, so as to overcome the limitation of the limited visual angle of a single stereo vision system and the limited workspace, overcome the limitation that the traditional multi stereo vision system cannot adjust the position and pose in the working process, and make the application of stereo vision system more extensive. The application of the disclosure to the navigation of instruments in the operating room has the advantages of low cost, flexible working space and high positioning accuracy.

BRIEF DESCRIPTION OF THE DRAWINGS

FIG. 1 is a schematic diagram of each vision system, pasted marks and coordinate systems in the cascading expansion method of working space and working visual angle of stereo vision system provided by embodiment 1 of the present disclosure.

DESCRIPTION OF REFERENCE MARKS

1, No. 1 stereo vision system; 2, No. 2. stereo vision system; 3, triple X combination Marker marker; 4, global vision system bracket; 5, self-locking traction manipulator.

DETAILED DESCRIPTION OF THE EMBODIMENTS

The technical scheme in the embodiments of the disclosure will be clearly and completely described below in combination with the accompanying drawings in the embodiments of the disclosure. Obviously, the described embodiments are merely illustrative and are not intended to limit the disclosure.

The cascading expansion method of working space and working visual angle of stereo vision system provided by the present disclosure includes the following steps.

S1: N stereo vision systems are selected, with the No. 1 stereo vision system as a master stereo vision system and the No. 2 to No. N stereo vision systems as slave stereo vision systems. A visual coordinate system of the master stereo vision system is taken as a global reference coordinate system $\{W\}$. N is an integer greater than 1.

S2: A manual marker Marker$_n$ is pasted or printed on an outer surface of the No. n stereo vision system, and a local coordinate system $\{M_n\}$ is established by the manual marker Marker$_n$, wherein, n=2, 3, . . . , N. And different stereo vision systems correspond to different manual markers.

Specifically, the manual marker is a plane manual marker and is unique. For example, for any two manual markers Marker$_i$ and Marker$_j$, where i=2, 3, . . . , N, j=2, 3, . . . , N, i≠j, they should be able to be distinguished by nature to represent different stereo vision systems respectively.

S3: An inherent position and posture relationship between the local coordinate system $\{M_n\}$ established by the manual marker Marker$_n$ and a visual coordinate system $\{C_n\}$ of the No. n stereo vision system is described by a spatial mapping matrix $T_{\{C_n\} \to \{M_n\}}$ determined by calibration method.

S4: The No. 1 stereo vision system is fixedly connected with a global vision system bracket. After a working position and visual angle direction of the No. 1 stereo vision system are determined, the No. 1 stereo vision system is fixed and kept unchanged throughout the working process.

Specifically, the global vision system bracket can be a tripod, or other brackets suitable for fixing, which is not limited here.

S5: The No. n stereo vision system is fixedly connected with a No. n self-locking traction manipulator, and the working position and visual angle direction of the No. n stereo vision system are adjusted at any time through force traction, so that the manual marker Marker$_n$ is visible in an effective working space of the No. 1 stereo vision system, and a target P to be measured is visible in an effective working space of the No. n stereo vision system.

S6: A spatial position and posture of the local coordinate system $\{M_n\}$ established by the manual marker Marker$_n$ on the No. n stereo vision system is measured by the No. 1 stereo vision system, and is recorded as $T_{\{M_n\} \to \{W\}}$. A position and posture of the target P to be measured in the effective workspace of the No. n stereo vision system is measured by the No. n stereo vision system, and is recorded as $P^{\{C_n\}}$. In combination with the spatial mapping matrix $T_{\{C_n\} \to \{M_n\}}$ of the local coordinate system $\{M_n\}$ established by the calibrated manual marker Marker$_n$ and the visual coordinate system $\{C_n\}$ of the No. n stereo vision system, a transformation of the position and posture of the target P to be measured from the visual coordinate system $\{C_n\}$ of the No. n stereo vision system to the visual coordinate system of the No. 1 stereo vision system, that is, the global reference coordinate system $\{W\}$, is realized:

$$\hat{P}^{\{W\}} = T_{\{M_n\} \to \{W\}} \cdot T_{\{C_n\} \to \{M_n\}} \hat{P}^{\{C_n\}}.$$

wherein, $\hat{P}^{\{W\}}$ is coordinates of the target P to be measured in the global reference coordinate system $\{W\}$, $\hat{P}^{\{C_n\}}$ is coordinates of the target P to be measured in the visual coordinate system $\{C_n\}$ of the No. n stereo vision system, $\hat{P} = [x\ y\ z\ 1]^T$ is homogeneous coordinates of $P = [x\ y\ z]^T$, and (x, y, z) is coordinates of the target P to be measured in the three-dimensional space coordinate system.

During specific implementation, in the cascading expansion method of working space and working visual angle of stereo vision system of the present disclosure, in step S2, the manual marker Marker$_n$ may be a planar marker with at least three non-collinear feature points. For example, the manual marker Marker$_n$ can be a triple X combination Marker marker, which is composed of three non collinear X corners according to certain rules, which is convenient for visual algorithm detection and establishment of local coordinate system.

The specific implementation of the cascading expansion method of working space and working visual angle of stereo vision system provided by the disclosure is described in detail below through a specific embodiment.

Embodiment 1

In the first step, as shown in FIG. 1, two stereo vision systems are selected and are numbered as No. 1 stereo vision system 1 and No. 2 stereo vision system 2 respectively. The No. 1 stereo vision system 1 is selected as the master stereo vision system and No. 2 stereo vision system 2 is selected as the slave stereo vision system.

Specifically, if the two stereo vision systems are the same, any one of them can be numbered as No. 1 and the other as No. 2. If the two stereo vision systems are different, the stereo vision system with the best performance or the highest accuracy should be selected as No. 1, and the other stereo vision system as No. 2.

In the second step, a triple X combination Marker marker 3 is pasted or printed on the outer surface of the No. 2 stereo vision system. In the No. 2 stereo vision system 2 shown in FIG. 1, a local coordinate system $O_M\text{-}X_M Y_M Z_M$ of the triple X combination Marker marker is established, and is recorded as local coordinate system $\{M_2\}$.

In the third step, the left eye camera coordinate system $O_1\text{-}X_1 Y_1 Z_1$ of the No. 2 stereo vision system 2 is taken as the visual coordinate system of the No. 2 stereo vision system 2, which is recorded as $\{C_2\}$. Because the triple X combination Marker marker is fixedly connected with the No. 2 stereo vision system 2, there is an inherent relative position and pose relationship between $\{M_2\}$ and $\{C_2\}$, which can be described by the spatial mapping matrix $T_{\{C_2\}\rightarrow\{M_2\}}$. And $T_{\{C_2\}\rightarrow\{M_2\}}$ can be determined by the calibration method.

In the fourth step, the No. 1 stereo vision system 1 is fixedly connected with the global vision system bracket 4, and the No. 1 stereo vision system 1 is fixed after the appropriate working position and visual angle direction are selected, and the No. 1 stereo vision system 1 is kept unchanged throughout the working process. The left eye camera coordinate system $O_0\text{-}X_0 Y_0 Z_0$ of the No. 1 stereo vision system 1 is taken as the global reference coordinate system, which is recorded as $\{W\}$.

In the fifth step, the No. 2 stereo vision system 2 is fixedly connected with the self-locking traction manipulator 5, and the working position and visual angle direction of the No. 2 stereo vision system 2 are adjusted at any time as required, so that the triple X combination Marker marker is visible and detectable in an effective working space of the No. 1 stereo vision system, and the target P to be measured is visible and detectable in the effective working space of the No. 2 stereo vision system 2.

In the sixth step, a spatial position and posture of the local coordinate system established by the triple X combination Marker marker on the No. 2 stereo vision system 2 is measured by the No. 1 stereo vision system, and is recorded as $T_{\{M_2\}\rightarrow\{W\}}$. A position and posture of the target P to be measured in the effective workspace of the No. 2 stereo vision system 2 is measured by the No. 2 stereo vision system 2, and is recorded as $P^{\{C_2\}}$. In combination with the spatial mapping matrix $T_{\{C_2\}\rightarrow\{M_2\}}$ of the calibrated visual coordinate system $\{C_n\}$ of the No. 2 stereo vision system 2 and the local coordinate system $\{M_2\}$ established by the triple X combination Marker marker, a transformation of the position and posture of the target P to be measured from the visual coordinate system $\{C_2\}$ of the No. 2 stereo vision system 2 to the visual coordinate system of the No. 1 stereo vision system, that is, the global reference coordinate system $\{W\}$, is realized:

$$\hat{P}^{\{W\}} = T_{\{M_n\}\rightarrow\{W\}} \cdot T_{\{C_n\}\rightarrow\{M_n\}} \hat{P}^{\{C_n\}}$$

wherein, $\hat{P}^{\{W\}}$ is coordinates of the target P to be measured in the global reference coordinate system $\{W\}$, $\hat{P}^{\{C_n\}}$ is coordinates of the target P to be measured in the visual coordinate system $\{C_n\}$ of the No. n stereo vision system, $\hat{P} = [x\ y\ z\ 1]^T$ is homogeneous coordinates of $P = [x\ y\ z]^T$, and $(x, y, z)$ is coordinates of the target P to be measured in the three-dimensional space coordinate system.

In the cascading expansion method of working space and working visual angle of stereo vision system provided by the disclosure, one stereo vision system in the multi stereo vision systems is fixed as the global vision system, and the other stereo vision systems can move the position and adjust the visual angle according to the needs during the working process, so as to effectively expand the working space and working visual angle of the stereo vision system and improve the flexibility of the stereo vision system. For the target to be measured that cannot be seen under the global stereo vision, the indirect positioning of the target to be measured under the global coordinate system can be achieved through other stereo vision systems, so as to overcome the limitation of the limited visual angle of a single stereo vision system and the limited workspace, overcome the limitation that the traditional multi stereo vision system cannot adjust the position and pose in the working process, and make the application of stereo vision system more extensive. The application of the disclosure to the navigation of instruments in the operating room has the advantages of low cost, flexible working space and high positioning accuracy.

Obviously, those skilled in the art can make various variations and modifications to the disclosure without departing from the spirit and scope of the disclosure. Thus, if these variations and modifications of the disclosure fall within the scope of the claims of the disclosure and its equivalent technology, the disclosure is also intended to include these variations and modifications.

What is claimed is:

1. A cascading expansion method of working space and working visual angle of stereo vision system, comprising:

S1: selecting N stereo vision systems, with a No. 1 stereo vision system as a master stereo vision system and No. 2 to No. N stereo vision systems as slave stereo vision systems, and taking a visual coordinate system of the master stereo vision system as a global reference coordinate system $\{W\}$; wherein N is an integer greater than 1;

S2: pasting or printing a manual marker Marker$_n$ on an outer surface of the No. n stereo vision system, and establishing a local coordinate system $\{M_n\}$ by the manual marker Marker$_n$; wherein, n=2, 3, ..., N, and different stereo vision systems correspond to different manual markers;

S3: describing, by a spatial mapping matrix $T_{\{C_n\}\rightarrow\{M_n\}}$, an inherent position and posture relationship between the local coordinate system $\{M_n\}$ established by the manual marker Marker$_n$ and a visual coordinate system $\{C_n\}$ of the No. n stereo vision system; wherein, the spatial mapping matrix $T_{\{C_n\}\rightarrow\{M_n\}}$ is determined by calibration method;

S4: fixedly connecting the No. 1 stereo vision system with a global vision system bracket, determining a working position and visual angle direction of the No. 1 stereo vision system, fixing the No. 1 stereo vision system and keeping the No. 1 stereo vision system unchanged throughout the working process;

S5: fixedly connecting the No. n stereo vision system with a No. n self-locking traction manipulator, and adjusting the working position and visual angle direction of the No. n stereo vision system at any time through force traction, so that the manual marker Marker$_n$ is visible in an effective working space of the No. 1 stereo vision system, and a target P to be measured is visible in an effective working space of the No. n stereo vision system;

S6: measuring, by the No. 1 stereo vision system, a spatial position and posture of the local coordinate system $\{M_n\}$ established by the manual marker Marker$_n$ on the No. n stereo vision system, and recording the measured spatial position and posture as $T_{\{M_n\}\rightarrow\{W\}}$, measuring, by the No. n stereo vision system, a position and posture of the target P to be measured in the effective workspace of the No. n stereo vision system, and recording the measured position and posture of the target P to be measured as $P^{\{C_n\}}$; and in combination with the spatial mapping matrix $T_{\{C_n\}\rightarrow\{M_n\}}$ of the local coordinate system $\{M_n\}$ established by the calibrated manual marker Marker$_n$ and the visual coordinate system $\{C_n\}$ of the No. n stereo vision system, realizing a transformation of the position and posture of the target P to be measured from the visual coordinate system $\{C_n\}$ of the No. n stereo vision system to the visual coordinate system of the No. 1 stereo vision system, that is, the global reference coordinate system $\{W\}$:

$$\hat{P}^{\{W\}} = T_{\{M_n\}\rightarrow\{W\}} \cdot T_{\{C_n\}\rightarrow\{M_n\}} \hat{P}^{\{C_n\}}$$

wherein, $\hat{P}^{\{W\}}$ is coordinates of the target P to be measured in the global reference coordinate system $\{W\}$, $\hat{P}^{\{C_n\}}$ is coordinates of the target P to be measured in the visual coordinate system $\{C_n\}$ of the No. n stereo vision system, $\hat{P}=[x\ y\ z\ 1]^T$ is homogeneous coordinates of $P=[x\ y\ z]^T$, and (x, y, z) is coordinates of the target P to be measured in the three-dimensional space coordinate system.

2. The cascading expansion method of working space and working visual angle of stereo vision system of claim 1, wherein in step S2, the manual marker Marker$_n$ is a planar marker with at least three non-collinear feature points.

* * * * *